US012075236B2

(12) United States Patent
Caserta et al.

(10) Patent No.: US 12,075,236 B2
(45) Date of Patent: Aug. 27, 2024

(54) METHOD FOR CONCEALING A SUBSCRIPTION IDENTIFIER AT A USER EQUIPMENT OF A MOBILE COMMUNICATION NETWORK, AND CORRESPONDING SYSTEM AND COMPUTER PROGRAM PRODUCT

(71) Applicant: STMicroelectronics S.r.l., Agrate Brianza (IT)

(72) Inventors: Francesco Caserta, Naples (IT); Amedeo Veneroso, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 317 days.

(21) Appl. No.: 17/655,867

(22) Filed: Mar. 22, 2022

(65) Prior Publication Data

US 2022/0330017 A1     Oct. 13, 2022

(30) Foreign Application Priority Data

Apr. 9, 2021     (IT) ........................ 102021000008951

(51) Int. Cl.
*H04W 12/03*     (2021.01)
*H04W 8/18*     (2009.01)
*H04W 12/041*     (2021.01)
*H04W 12/0431*     (2021.01)

(52) U.S. Cl.
CPC ............. *H04W 12/03* (2021.01); *H04W 8/18* (2013.01); *H04W 12/041* (2021.01); *H04W 12/0431* (2021.01)

(58) Field of Classification Search
CPC ..... H04W 12/03; H04W 8/18; H04W 12/041; H04W 12/0431; H04W 12/00; H04L 2209/80; H04L 9/40; H04L 9/0841; H04L 9/0894; H04L 9/14; H04L 9/3066; G06F 21/6245; G06F 21/602
See application file for complete search history.

(56) References Cited

U.S. PATENT DOCUMENTS

| 11,528,604 B2 * | 12/2022 | Bradley | ................... H04W 4/40 |
| 2005/0169462 A1 * | 8/2005 | Jung | ........................ G06F 7/725 380/28 |
| 2017/0180114 A1 * | 6/2017 | Murdica | ................. H04L 9/003 |

(Continued)

*Primary Examiner* — Kenneth T Lam
(74) *Attorney, Agent, or Firm* — Slater Matsil, LLP

(57) ABSTRACT

A method for concealing a subscription identifier at a user equipment including a mobile equipment and an integrated circuit card storing the subscription identifier, the method including receiving a corresponding request by a server to provide a corresponding subscription identifier, performing an elliptical curve encryption of the subscription identifier generating a concealed subscription identifier, the concealing operation including the mobile equipment sending an identity retrieve command to the card, performing, before receiving the identity retrieve command at the card, a pre-calculation of the ephemeral key pair including an ephemeral private key and ephemeral public key and the shared secret key, and in response to the respective state of completion indicating that completion of the computation of a valid ephemeral key pair or shared secret key, storing the corresponding values of the ephemeral key pair and shared secret key in a table in a memory of the card.

20 Claims, 5 Drawing Sheets

(56) References Cited

U.S. PATENT DOCUMENTS

| | | | |
|---|---|---|---|
| 2019/0089532 A1* | 3/2019 | Lambert | H04L 63/0853 |
| 2019/0098502 A1* | 3/2019 | Torvinen | H04W 12/72 |
| 2019/0364430 A1* | 11/2019 | Ainali | H04W 8/20 |
| 2020/0204985 A1* | 6/2020 | An | H04W 4/60 |
| 2020/0260273 A1* | 8/2020 | Bradley | H04L 9/3234 |
| 2020/0344601 A1 | 10/2020 | Baskaran et al. | |
| 2021/0021993 A1* | 1/2021 | Yang | H04W 12/0433 |
| 2021/0092603 A1* | 3/2021 | Yang | H04L 9/0822 |
| 2021/0185523 A1* | 6/2021 | Targali | H04W 12/0471 |
| 2021/0203489 A1* | 7/2021 | Moran | H04L 9/0861 |
| 2021/0368345 A1* | 11/2021 | Nakarmi | H04L 9/0825 |
| 2022/0006625 A1* | 1/2022 | Nix | H04L 9/3073 |
| 2022/0141016 A1 | 5/2022 | Simon et al. | |
| 2022/0248221 A1* | 8/2022 | Nix | H04W 12/02 |
| 2022/0264300 A1* | 8/2022 | Nix | H04L 9/3265 |
| 2022/0295276 A1* | 9/2022 | Yang | H04L 9/3271 |

* cited by examiner

METHOD FOR CONCEALING A SUBSCRIPTION IDENTIFIER AT A USER EQUIPMENT OF A MOBILE COMMUNICATION NETWORK, AND CORRESPONDING SYSTEM AND COMPUTER PROGRAM PRODUCT

CROSS-REFERENCE TO RELATED APPLICATIONS

This application claims the benefit of Italian Patent Application No. 102021000008951, filed on Apr. 9, 2021, which application is hereby incorporated herein by reference.

TECHNICAL FIELD

Embodiments of the present disclosure relate to solutions for concealing a subscription identifier, in particular a Subscription Permanent Identifier (SUPI), at a user equipment, in particular comprising an integrated circuit card, configured to operate with mobile communication networks such as 3GPP mobile communication networks and subsequent networks.

Embodiments of the present disclosure relate in particular to the technical context of Remote SIM Provisioning technology, also known as the Embedded UICC (Universal Integrated Circuit Card), although they also relate to classical SIM/UICC.

BACKGROUND

Universal Integrated Circuit Cards (UICCs), often referred as Subscriber Identity Module (SIM) cards, are widely used to enable the mobile devices to access services provided by Mobile Network Operators (MNOs).

FIG. 1 shows a possible architecture of a user equipment or mobile equipment 10, such as a mobile device, e.g. a smartphone or a tablet, or a mobile communication module usually to be used in embedded systems.

Generally, the device 10 comprises one or more processors 102 connected to one or more memories 104. The device 10 comprises moreover at least one mobile communication interface 106 for radio communication over radio channel.

For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) and/or 5G transceiver.

A mobile device comprises often also a user interface 110, such as a touchscreen or keypad. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as but not limited to a UART (Universal Asynchronous Receiver-Transmitter), SPI (Serial Peripheral Interface), I2C (Inter Integrated Circuit) and/or USB (Universal Serial Bus) communication interface.

Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored, e.g., an operating system OS being executed by the processor 102 and which manages the general functions of the device 10, such as the management of the user interface 110 and/or the communication interface 112 and the establishment of a connection with the base station BS of serving network via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the user identification. For example, usually a mobile device comprises a card holder for receiving a card comprising a Subscriber Identity Module (SIM), which is usually called SIM card. For example, nowadays is often used a Universal Integrated Circuit Card (UICC) 108, which is a smart card often used, but not limited, in GSM, UMTS, LTE, W-CDMA, 5G networks. The UICC ensures the integrity and security of all kinds of personal data and typically holds a few hundred kilobytes.

For example, a UICC 108 may contain a SIM application, a USIM application, an ISIM application, a CSIM application in order to provide more services to the card holder like the storage of a phone book and other applications.

Accordingly, the reference to a SIM module in the following of the present description is intended to include modules for the above networks and applies also to the case in which such a SIM module is provided on a SIM card. Moreover, the present description applies also to the so-called Machine-to-Machine (M2M) SIM modules.

Those of skill in the art will appreciate that the communication between the device 10 and the SIM module 108 follows the master/slave principle, in which the device 10 represents the master and the SIM module 108 the slave. For this reason, the device 10 sends given commands to the SIM module 108 and the SIM module acknowledges the command.

As shown in FIG. 2, a SIM module 108 often comprises one or more processors 1082, e.g., in the form of a co-processor, and one or more memories 1084 for executing applications stored in the memory 1084 of the module 108.

For example, the SIM module 108 may comprise in addition to the Subscriber Identity Module application (reference sign SIM in FIG. 2) at least one further application APP, which may be for instance a Java applet. For example, this application APP may be configured to communicate (usually via the processor 102 and possibly the operating system OS) with the mobile communication interface 106 in order to send data to and/or receive data from the device 10 on behalf of a remote host 30.

For this purpose, the host 30 may be connected via a network 20 to the base station BS. Accordingly, connection between the host 30 and the UICC 108 may be established by means of the network 20, the base station BS and the communication interface 106.

Generally, the communication may be initiated by the host 30 or requested by the UICC 108.

For example, the application APP may be a web server application, which receives requests from the web browser WB of a mobile device 10 and obtains respective content from a remote host 30, such as a web server.

The application APP may also be an authentication application. In this case, the host 30 may send an authentication request to the UICC 108 via the device and the UICC 108 shall send an authentication response to the host 30 via the same device.

One or more profiles of mobile network operators can be stored in the memory 108. Each profile is represented by a memory area in the memory 1084 of the SIM card for storing applications APP, such as a respective applet for each profile. The content of the memory 108, and in particular of the non-volatile memory 1084 can be indicated as a whole as card information which corresponds to a data image of card data CD. Also, subscriber identifiers like IMSI or SUPI in 5G are stored here within the profile. SUPI is the equivalent in 5G of IMSI. SUPI is a general concept that applies to several technologies, and when it applies to Telecommunication services (UMTS evolution) it replaces the IMSI.

Thus, a UICC card usually comprises a microprocessor and a memory, typically including a non-volatile and a volatile portion. Such memory, for instance a flash memory, can be divided in a memory pages. Such memory is configured to store data such as an operative system, applets and an MNO profile that a mobile device can utilize to register and interact with an MNO. The UICC can be removably introduced in a slot of a device, i.e. a mobile device, or they can also be embedded directly into the devices, in this case they are called eUICC. eUICC cards are useful since for their nature are designed to remotely receive MNO profiles.

In 3GPP Release 15, due to the privacy requirements (like the GDPR, General Data Protection Regulation), the subscriber identifier (formerly known as IMSI and known as SUPI (Subscription Permanent Identifier) in the operations such as authentication in order to perform registration to a mobile network needs to be sent via an encrypted channel, specifically a ECDH/X25519 based encrypted channel, from a user equipment, comprising a mobile equipment and an integrated card, e.g. an eUICC (embedded Universal Integrated Circuit Card). The subscriber identifier, IMSI or SUPI, is part of the subscriber profile stored in the memory, e.g. non-volatile memory 1084, of the card and enabled for operation. ECDH/X25519 is used to protect the SUPI in order that only authorized servers can access to it, namely the MNO servers.

This is because the subscriber identifier, IMSI or SUPI, is sent to a server of the Serving Network (e.g., NodeB and MME), protected by a symmetric key generated from the shared secret of a Diffie-Hellman key agreement involving the server Elliptical Curve public key, indicated as srvPuK.

In FIG. 3 it is schematically represented a system 50 including basic elements for authentication in 3GPP 15. The system 50 includes a user equipment 11, comprising a mobile equipment 11a, for instance a mobile phone or an IoT (Internet of Things) device, comprising an integrated circuit card 12, in a non-volatile memory 12a, which may correspond to memory 1084 in FIG. 2, in which is stored a subscribed identifier, specifically SUPI identifier, PI, along with the corresponding enable profile. The user equipment 11 communicates through radio channels with a Serving Network 13, which for instance includes a NodeB and an MME (Mobility Management Entity). In FIG. 1 it is also shown a Home Network 14, with which the MME interacts to authenticate the user. Such an interaction typically takes place at network attach, although there is a "lease time" and after that the server may request again the subscriber identifier, namely the SUPI.

The concealment procedure includes that:
a server of the Serving Network 13, for instance following a registration request by the user equipment 11, sends a request RQT, through the mobile equipment 11a in the user equipment 11, e.g. the mobile phone, to the integrated circuit card 12, to generate an Identity. This operation performed by the Mobile Equipment 11 upon the receival of request RQT is a GET IDENTITY operation GI.

The card 12 once the request RQT is received performs generation of an ephemeral key pair, i.e. a pair of ephemeral private key ephPrK and ephemeral public key, ephPuK, thus (ephPrK, ephPuK) where ephPuK=ephPrK*G, G indicating a generator value. In the case of the EC group is not a value, it is a point in the curve, according to the definition of the elliptic curve. Specifically, this operation is the scalar multiplication between the scalar ephPrK and the generator G, as defined in the chosen group. In the GET IDENTITY the addition on an elliptic curve is used as group. So, the scalar multiplication is the repetition ephPrK times of the addition of G to itself. The scalar multiplication is thus performed iteratively performing and iteration comprising a set of operations for each bit of the Ephemeral Private key ephPrK. The generator value is a value of the chosen group. In the case of the elliptic curve group it is a point in the curve; use of the Ephemeral Private key ephPrK to make a Shared secret ShS with the server public key, as the product of the Ephemeral Private key ephPrK and the server Elliptical Curve public key srvPuK, ephPrK*srvPuK; and use of the shared secret ShS to derive by means of a Key Derivation Function KDF, the keys used to encrypt (CCM, counter with cipher block chaining message authentication code) the subscriber identifier, e.g., SUPI, PI, that is sent encrypted to the server of the Serving Network 13.

The concealment procedure referred to SUPI identifiers is called SUPI concealment and the outcome is called SUCI (Subscription Concealed Identifier), indicated with CI in FIG. 3.

In FIG. 4 it is shown schematically a SUPI concealed identifier CI structure, which is a frame comprising six subsequent fields.

The first field ST, value 0-7, is the SUCI Type. The second field HNI is a Home Network Identifier, which value depends on SUPI type. Then a third field RI, of 1-4 digits, contains the Routing Indicator. A fourth field PS, with value 0-15, contains a Protection Scheme, while a fifth field HNPK with value from 0 to 255 contains a Home Network Public Key ID. Finally, a sixth field PSO contains a Protection Scheme Output, which depends on the Scheme used.

Therefore, the operation GI labelled GET IDENTITY requires two scalar multiplications performed at the integrated circuit card:
Key Pair generation (ephPuK=ephPrK*G), and
Diffie-Helmann scalar multiplication (ShS= ephPrK*srvPuK).

Such operation, when the group chosen is an elliptic curve over a finite field, such as in the 5G specification, is quite slow and complex with IoT devices, which usually adopt eUICC cards, and the operation consumed power is usually not consistent with low power requirements.

IoT devices typically may not be equipped with a cryptographic coprocessor making the operation very slow. Cryptographic co-processor is a dedicated ALU present in high end smartcards, i.e. integrated circuit card such eUICC, to accelerate asymmetric computations.

Thus, the SUCI computation is quite complex and apparently incompatible with timing and power consumption requirements of IoT devices.

Currently, SUCI calculation is performed "on demand", when the GET IDENTITY request is received. This may lead to a very slow GET IDENTITY execution.

SUMMARY

On the basis of the foregoing description, the need is felt for solutions which overcome one or more of the previously outlined drawbacks.

According to one or more embodiments, such an object is achieved through methods having the features specifically set forth in the claims that follow. Embodiments moreover concerns a related system as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

As mentioned in the foregoing, the present disclosure provides solutions regarding a method for concealing a subscription identifier, in particular Subscription Permanent Identifier, at a user equipment of a mobile communication network, comprising a mobile equipment and an integrated circuit card which stores subscription data for accessing the mobile communication network including the subscription identifier, the method comprising, upon receiving at the user equipment a corresponding request by a server to provide a corresponding subscription identifier, performing an Elliptical Curve encryption of the subscription identifier generating a concealed subscription identifier, the concealing operation comprising that the mobile equipment of the user equipment sends an identity retrieve command, in particular a GET IDENTITY command, to an integrated circuit card in the mobile equipment, the Elliptical Curve encryption including performing at the integrated circuit card the operations of:

generating an ephemeral key pair comprising an ephemeral private key and ephemeral public key, performing a first scalar multiplication of the ephemeral private key by a generator value to obtain the ephemeral public key, the scalar multiplication being performed iteratively performing and iteration comprising a set of operations for each bit of the Ephemeral Private key, generating a Shared secret key performing a second scalar multiplication of the Ephemeral Private key by a server public key;

using the shared secret key to derive keys to encrypt the subscription identifier, which is to be sent to the server as concealed subscription identifier as response of the identity retrieve command, the scalar multiplication being performed iteratively performing and iteration comprising a set of operations for each bit of the Ephemeral Private key, the method comprising performing, before receiving the identity retrieve command at the card, a pre-calculation of the ephemeral key pair comprising an ephemeral private key and ephemeral public key and the shared secret key, the pre-calculation including performing an interruptible calculation of the first and second scalar multiplication during the execution time of given periodic commands, in particular APDU STATUS commands, sent by the mobile equipment to the card, storing a respective state of completion of the calculation, the interruptible calculation including checking at the beginning of each of the execution time the respective state of completion, if the respective state of completion indicates that completion of the computation of a valid ephemeral key pair or shared secret, storing the corresponding values of ephemeral private key, ephemeral public key and shared secret in a table in a memory, in particular a flash memory, of the integrated circuit card at the user equipment.

In variant embodiments, the method includes interrupting the calculation at the end of the execution time on the basis of an estimated execution duration or interrupting the calculation under control of a card scheduler.

In variant embodiments, the performing an interruptible calculation of the first and second scalar multiplication comprises performing a first verifying step verifying if the calculation of the public key is in progress by checking the completion status of the public key computation, if the result of the first verifying step is affirmative, continuing the calculation of the public key, then performing a second verifying step verifying if the calculation of the shared secret is in progress by checking the completion status of the shared secret computation, if the result of the first verifying step is negative performing directly the second verifying step, if the result of the second verifying step is affirmative, continuing the calculation of the shared secret, then performing a third verifying step verifying if there are less or equal available ephemeral keys than available shared secrets, if the result of the second verifying step is negative performing directly the third verifying step, if the result of the third verifying step is affirmative, starting a new calculation of the ephemeral pair, followed by a step of new calculation of the shared secret being started either if the third verification step is negative or after starting a new calculation of the ephemeral pair.

In variant embodiments, the method includes an ephemeral Queue in which are added the ephemeral value pairs computed at each iteration and a Queue of shared secrets in which are added the shared secret values computed at each iteration.

In variant embodiments, the method includes that if the identity request is received at the card, if there is at least an ephemeral key pair available and complete in the queue of the ephemeral pairs and there is at least a shared secret available and complete in the queue of the shared secrets, to the ephemeral pair is assigned the value of the first pair queue element in the ephemeral Queue, and to the shared secret is assigned the value of the first element of the queue of shared secrets, else the step of performing an interruptible calculation of the first and second scalar multiplication is completed and to the ephemeral pair is assigned the value of the only pair queue element in the ephemeral Queue, and to the shared secret is assigned the value of the only element of the Queue of shared secrets.

In variant embodiments, the method includes that set of values of the completed keys and secret are stored in corresponding slots of the card memory, and in case multiple user profiles are downloaded in different instants to the card the set of values for each profile are stored in respective set of slots, then, given the current profile among the multiple profiles which is enabled for operation, a set of values associated to the current profile it is used and flagged as used if such set of values is present with completed values.

In variant embodiments, the method includes that the iterative scalar multiplication is a Montgomery ladder scalar multiplication.

The present disclosure also provides solutions regarding a system for concealing a subscription identifier, in particular Subscription Permanent Identifier, comprising a user equipment of a mobile communication network, comprising a mobile equipment and an integrated circuit card which stores subscription data for accessing the mobile communication network including the subscription identifier, the system being configured to implement the method of any of the previous embodiments.

The present disclosure also provides solutions regarding an integrated circuit card configured to operate in the system above.

The present disclosure also provides solutions regarding a computer-program product that can be loaded into the memory of at least one processor and comprises portions of software code for implementing the method according to any of embodiments of the method described above.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 4 are denoted by the same references previously used in such Figures; the description of such previously described elements will not be repeated in the following in order not to overburden the present detailed description.

It is observed that the two scalar multiplications:

$$ephPuK = ephPrK*G \qquad (1)$$

$$ShS = ephPrK*srvPuK \qquad (2)$$

producing the ephemeral key pair (ephPrK, ephPuK) and the shared secret ShS are similar in logic but with an important difference:

the generator G is the curve generator and it is fixed (pre-known) as it depends on the chosen curve;

the server Elliptical Curve public key srvPuk is the network key, which is not fixed. For instance, it can be downloaded over the air in eUICC profile or through OTA (Over The Air) commands.

As a consequence, the multiplication ephPrk*G giving the ephemeral public key ephPuK may be also pre-computed and put in a table (e.g., 128 random+128 public keys occupies 12 kb of flash, 8 kb if the public keys are in compressed format), even at card creation time.

It is noted that according to ECC, the shared secret ShS is a point with coordinates (X,Y), but only the "X" value is used as input of the KDF, since the Y component is related to the X component by means of the curve equation. ephPuK, G, srvPuK are also points. ephPrK is a scalar.

The shared secret ShS cannot however be pre-computed at card creation time as the Server public key srvPuK is not static, but, although the SrvPuk can be possibly changed over the air (by updating via RFM the EF SUCI CALC INFO) and in this case the shared secret ShS would need to be invalidated, it appears anyway convenient for the card to pre-calculate the ShS before the GET IDENTITY command is executed.

Figure 1:
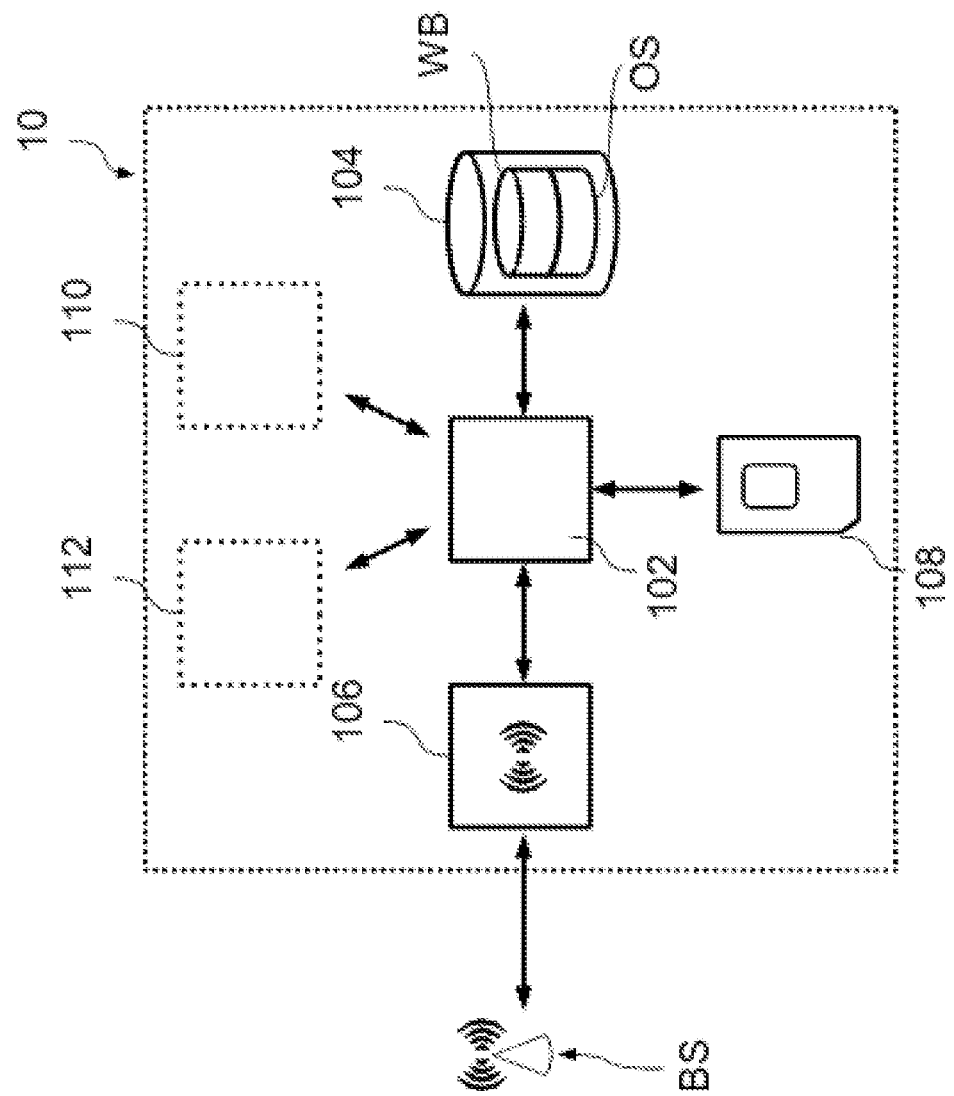
FIG. 1 illustrates an architecture of a user equipment.
Figure 2:
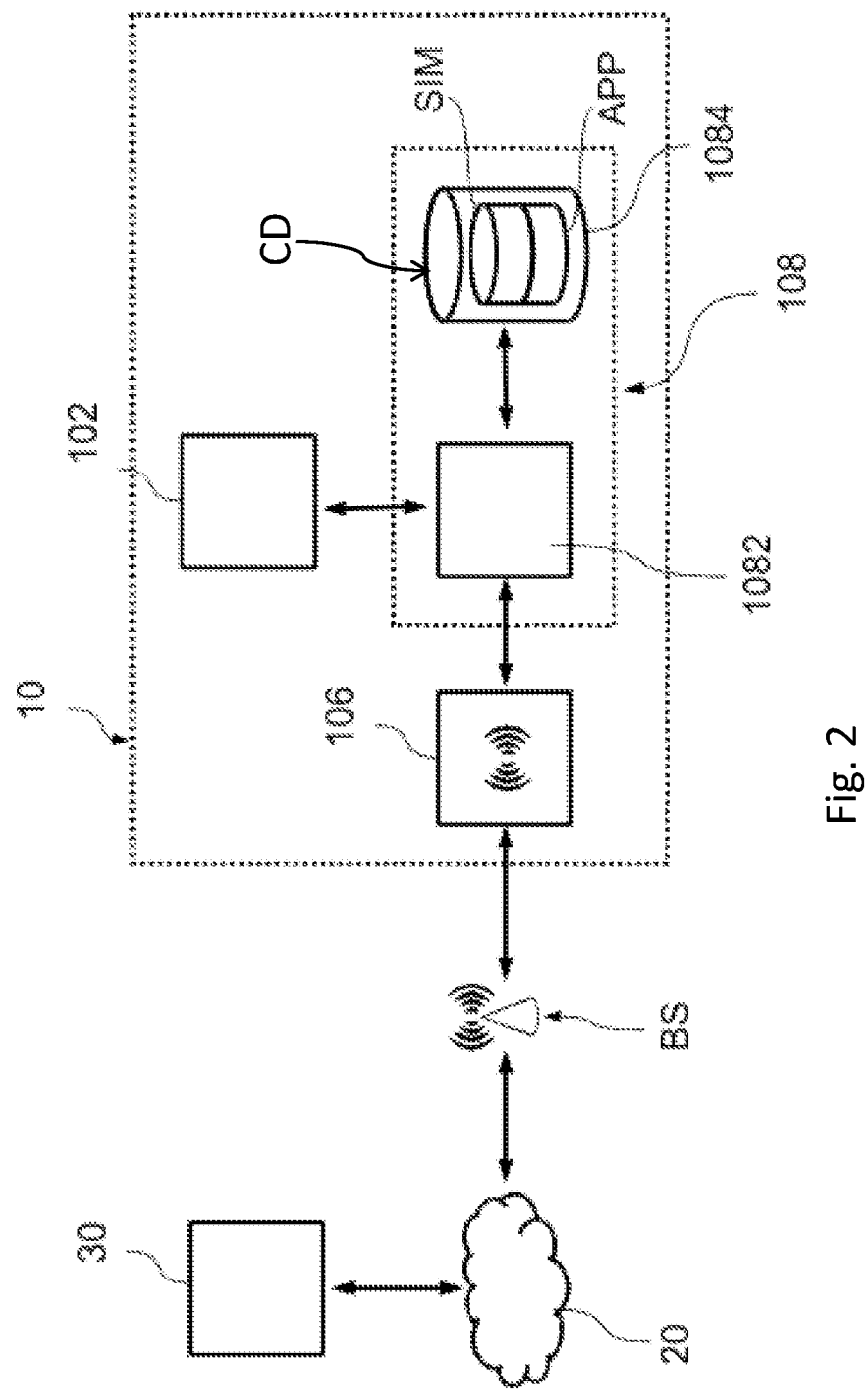
FIG. 2 illustrates further details of a SIM module in a user equipment.
Figure 3:
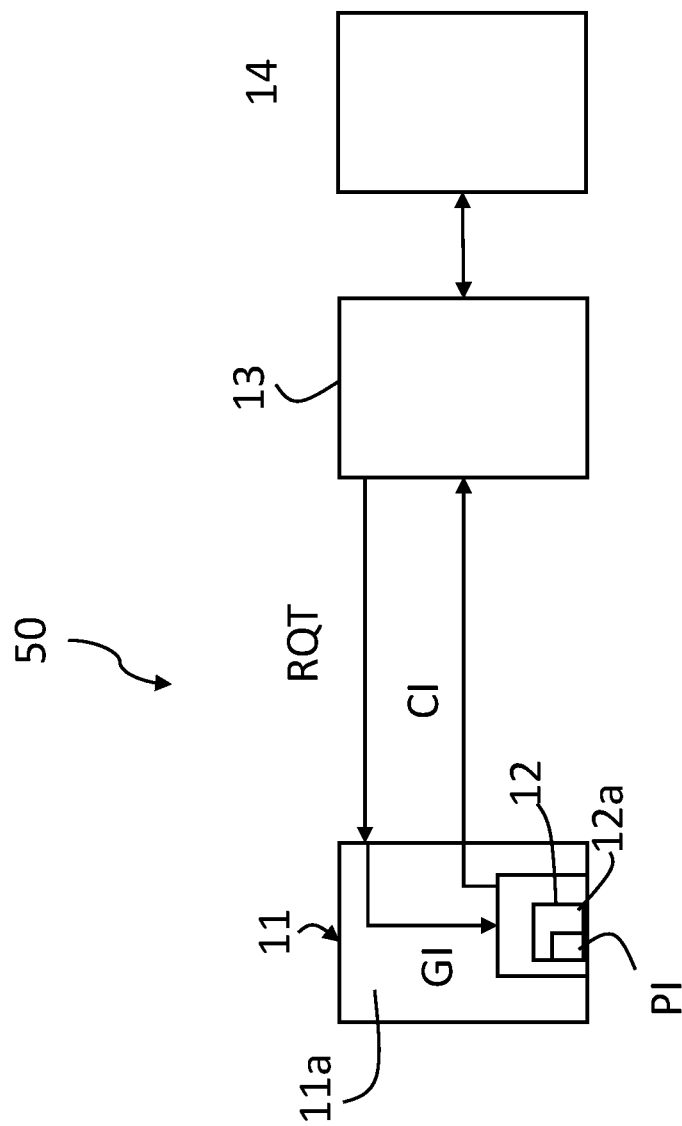
FIG. 3 illustrates a system including basic elements for authentication in 3GPP 15.
Figure 4:
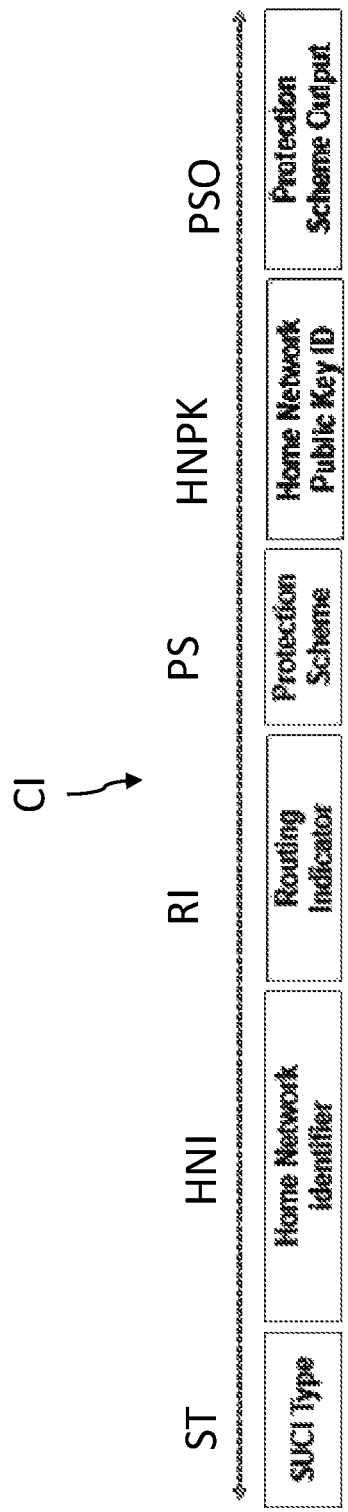
FIG. 4 illustrates a SUPI concealed identifier CI structure.
Figure 5:
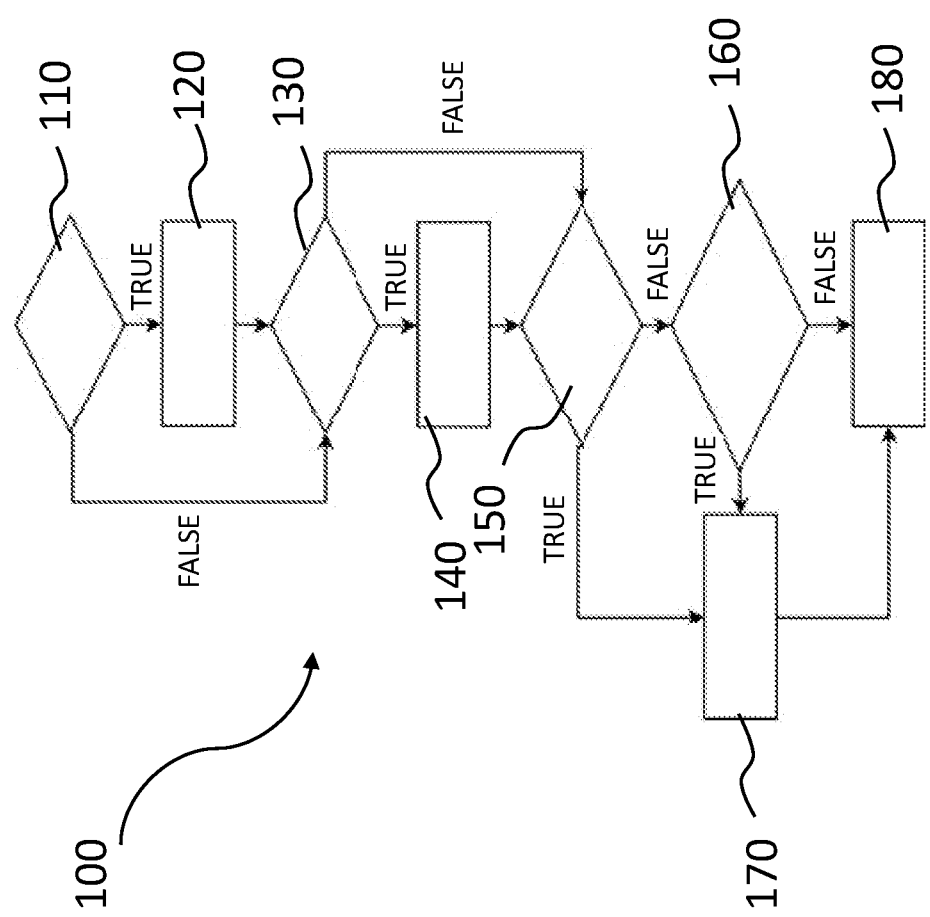
FIG. 5 shows a flow diagram of an embodiment method of concealing a subscription identifier.

Further, as shown with reference to the diagram flow of FIG. 5, in the mobile communication networks the user equipment, e.g., mobile phone is obliged to send to the integrated card, UICC or eUICC, a STATUS APDU (Application Protocol Data Unit), with a given periodicity, e.g. at least every 30 seconds.

According the solution here described, the repeated calls to the STATUS APDU can be used to give to the card computational time that can be used to pre-calculate pairs of ephemeral private key ephPrK and ephemeral public key (ephPrKi, ephPuKi) and pairs of ephemeral private key ephPrK and Shared secret (ephPrKi, ShSi). The index i indicates the current key pair couple/shared secret couple.

The execution time of the STATUS APDU might not be enough to calculate an entire scalar multiplication. However, both the scalar multiplications can be divided into incremental steps, that after a certain amount of STATUS APDUs give a valid (ephPrKi, epPubKi) or (ephPrKi, ShSi) pair.

In FIG. 5 is shown a diagram representing the performing of an interruptible calculation 100 of the first and second scalar multiplication during the execution time of given periodic commands, in particular STATUS APDU commands.

In a step 110 it is verified if the calculation of the public key ePuk is in progress (i.e., equation (1), ephPuK=ephPrK*G, involving a scalar multiplication).

If verification step 110 is affirmative the calculation of the public key ePuk is continued in a step 120, then it is verified in a step 130 if the calculation of the shared secret ShS is in progress (i.e., equation (2) ShS=ephPrK*srvPuK, involving a respective scalar multiplication). In the negative from step 110 the execution pass to step 130 directly.

If verification step 130 is affirmative, the calculation of the shared secret ShS is continued in a step 140, then it is verified in a step 150 if there are less or equal available key pairs (ephPrK, ephPuK) than available shared secrets. In the negative from step 130 the execution pass to step 150 directly.

If verification step 150 is affirmative, it is started the calculation of a new ephemeral pair in a step 160. Otherwise if the verification step 150 is negative, a step 170 of calculation of a new shared secret ShS is started. Step 170 also follows execution of step 160.

The operation 100 may be implemented by making the following data structures available at the initial step 110 of the operation 100:
- an ephemeral Queue EphKeyQ in which are stored (EphKeyQ[i].epPrK, EphKeyQ[i].epPuK) pairs, where EphKeyQ[i] is the i-th couple of keypairs stored in the queue. EphKeyQ[i].epPrK is the i-th private key stored in the queue, and EphKeyQ[i].epPuK is the i-th public key stored in the queue. Such queue EphKeyQ might be not empty when the card is issued, since these keys are purely ephemeral and not dependent by any means from the network;
- a Queue ShSQ of shared secrets. Such queue ShSQ is empty on card issuance, since the shared secret ShS depends on the public key srvPuK set by the network operator;
- a first integer variable EPuKState. This integer variable holds the state of the calculation, i.e. state of completion of calculation, of the last ephemeral public key ephPuK in the Queue EphKeyQ. Specifically, it contains the number of bits of the ephemeral private key ephPrK processed in the scalar multiplication. If this value is 0, the scalar multiplication has not started yet (default value). If it corresponds to the bit length of the private key (e.g. 256, equal to the curve length), public key ephPuK is ready;
- a second integer variable ShSState. This integer variable holds the state of the calculation of the last shared secret ShS in the Queue ShSQ of shared secrets. Specifically, it contains the number of bits of the ephemeral private key ephPrK processed during the scalar multiplication to calculate the associated ShS.

In the following it is described, using a Python-like pseudo language, an implementation of the operation 110 by a handler, i.e. a function, statusHandler. Specifically, it is pointed out that, like in Python, the item with index equal to −1 is the last element of a list/queue.

```
Function: statusHandler
Input: EphKeyQ, EPuKState, ShSQ, ShSState, G, srvPuk
if (EPuKState < 256):
    continueScalarMul(EphKeyQ[-1].ephPrK, EphKeyQ[-1].ephPuK, EPuKState, G)
if (ShSState < 256):
    continueScalarMul(ShSQ[-1].ephPrK, ShSQ[-1], ShSState, srvPuk)
if (len(EphKeyQ) <= len(ShSQ)):
    newEphPuK(EphKeyQ, EPuKState, G)
newShS(EphKeyQ, ShSQ, ShSState, srvPuk)
```

Thus, the step 110 of verifying if the calculation of the public key ePuk is in progress (i.e., equation (1), ephPuK=ephPrK*G, involving a scalar multiplication) is implemented by checking if the number of processed bits for the public key, is lower than the curve length, i.e. EPuKState<256, in other words the bits of the EPuKState are lower than the value indicating that the public key calculation over the generation curve is complete. In the affirmative, an incremental scalar multiplication function continueScalarMul is performed with respect to the operands of equation (1) starting from the iteration index EPuKState and the current public key value of EphKeyQ[−1].ephPuK, i.e. continueScalarMul(EphKeyQ[−1].ephPrK, EphKeyQ[−1].ephPuK, EPuKState, G), this corresponding to step 120 of continuing the calculation.

Then, the step 130 of verifying if the calculation of the shared secret ShS ePuk is in progress (i.e. equation (2) ShS=ephPrK*srvPuK, involving a respective scalar multiplication) is implemented by checking if the number of processed bits for the shared secret ShS, is lower than the curve length, i.e., ShSState<256, in other words the bits of the ShSState are lower than the value indicating that the shared secret ShS calculation over the generation curve is complete. In the affirmative, an incremental scalar multiplication function continueScalarMul is performed with respect to the operands of equation (2) starting from the iteration index ShSState and the current ShS value ShSQ[−1], i.e., continueScalarMul(EphKeyQ[−1].ephPrK, ShSQ[−1].ephPuK, ShSState, srvPuk), this corresponding to step 140 of continuing the calculation.

Then step 150 of verifying if the number of available ephemeral key pairs (ephPrK, ephPuK) in EphKeyQ is less or equal than the number of available shared secrets in ShSQ is performed by comparing the length of the ephemeral queues EphKeyQ and ShSQ.

If the verifying conditions 150 is verified, the function newEphPuK, corresponding to starting the calculation of a new ephemeral key pair (step 160) is performed. Once completed step 160, or in case the verifying step 150 is not verified, the step 170 of starting the calculation of a new shared secret ShS, based on the last stored private key in EphKeyQ, is finally performed.

An implementation in pseudocode is described here below:

```
Function: newEphPuK
Input: EphKeyQ, EPuKState, G
ephPrK = random(256)
ephPuK = O
EPuKState = o
EphKeyQ.add((ephPrK, ephPuK))
continueScalarMul(ephPrK, ephPuK, EPuKState, G)
Function: newShS
Input: EphKeyQ, ShSQ, ShSState, netPuK
shS = O
ShSState = o
ShSQ.add(shS)
continueScalarMul(EphKeyQ[-1].ephPrK, shS, ShSState, netPuK)
```

As shown, the function newEphPuK starts the calculation by initializing the new ephemeral private key ephPrK with a random value of 256 bits (i.e., the curve length). In other embodiments, the ephemeral private key ephPrK can also be initialized with the output of some Key Derivation Function. The public key ephPuK is, instead, initialized with the point at infinity O of the generation curve, while the state variable EPuKState is reset to zero, since a new ephemeral public key calculation is just starting. This two values, ephPrK and ephPuK, are then added at the end of the queue EphKeyQ by means of the add method applied to the ephemeral queue EphKeyQ (EphKeyQ.add). The scalar multiplication function continueScalarMul is then called to start the calculation of the ephemeral public key. This calculation will start from iteration 0 (since EPuKState has been initialized to 0), and with the ephemeral public key equal to O (the additive neutral element of the curve addition).

The function newShS starts the calculation by initializing at the point at infinity O of the generation curve the shared secret ShS. It then resets to zero the state variable ShSState, since the ShS calculation has not processed any bit yet, and adds the new incomplete shared secret ShS as last element to the shared secret queue ShSQ (ShSQ.add). The incremental scalar multiplication function continueScalarMul for the shared secret, is then started. This calculation will start from iteration 0 (since ShSState has been initialized to 0) and with the ShS equal to O (the additive neutral element of the curve addition).

The interruptible calculation 100 of the first and second scalar multiplication during the execution time of given periodic commands can be executed during the APDU STATUS execution for a given time then at the expiration of such given time is interrupted, e.g. if the STATUS APDU execution must be less than about 200 ms, and computing a scalar multiplication involves iteration steps of 2 ms each, 100 iteration steps in the continueScalarMul( ) function can be executed before interrupting the statusHandler routine. In variant embodiments, interruption can be commanded by a scheduler of the integrated card 12. More in detail, the entire process can be interrupted either by the scheduler (the status handler is taking too much time) or by an operation of the method itself, that can deduce (from the amount of scalar multiplication steps that it has executed) that the amount of computation performed is enough for a single status handler. The method in this way gives first priority to operations that are already to be completed, and then if the operations are already completed starts a new operation, in particular giving priority to the scalar multiplication that has less available values, or to the ephemeral keypairs in case of tie.

The iterative scalar multiplication continueScalarMul( ) depends on the algorithm chosen for the scalar multiplication. Several algorithms are available, but basically most of them loops through each bit of the private key, adding a certain quantity to the public key. The public key is ready when all the bits are looped.

Each time a bit of the private key is analyzed, and some quantity is added to the public key, the state (EPuKState or ShSState) is incremented by one.

As shown below, preferably it is used the Montgomery Ladder scalar multiplication, which is the most used and easily modifiable with only one further calculation (P1 assignment at the beginning. The scalar s and point P correspond respectively to the ephemeral private key and the ephemeral public key or the ShS (depending on the operation performed), the state variable corresponds to EPuKState of ShSState (depending on the operation) and the base point B correspond to the generator curve G point. Here below is described the implementation of the function continueScalarMul( ) in pseudocode, which implements the Montgomery Ladder scalar multiplication:

```
Function: continueScalarMul
Input: s (scalar), P (point), state, B (base point)
P1 ← point_add(P1, B)
```

```
while state < 256 do
    if get_bit(scalar, state) == o then
        P1 ← point_add(P, P1)
        P ← point_double(P)
    else
        P ← point_add(P, P1)
        P1 ← point_double(P1)
    state ← state + 1
get_bit(scalar, i) is a function to get the i-th bit (starting from
the most significant) of scalar s
point_add(P1, P2) is a function that returns the point addition over
the current curve
point_double(P) is a function that returns the point double over the
current curve.
```

The method here described further includes a procedure for handling the receival of a GET IDENTITY APDU from the equipment to the card, i.e. the APDU used to define the security level requested by the host during establishment of the secure messaging session, as for instance per 3gpp TS 31.102 Rel1 specification.

Once a GET IDENTITY APDU arrives, i.e. a GET identity is issued the card takes the first ephemeral pair (ePrK, ePuK) from pair queue EphKeyQ and the first shared secret ShS from secret queue ShSQ if available. In case one of them is not available, it might need to continue a calculation in progress and/or start a new calculation.

With the GET IDENTITY, which is executed when the network asks for the identity of the mobile phone, it is thus compute the SUCI, using the (ePrK, ePuK), ShS keys taken as just described above, and sent back.

The operator decrypts the SUCI and verifies the status.

Then the operator sends the Authenticate challenge to the card.

Since STATUS APDU are more frequent than GET IDENTITY APDU, most of the time the card will not have the two queues empty upon GET IDENTITY reception, and the GET IDENTITY will be very fast.

Here is described the get identity handler implementation

```
Function: getIdentityHandler
Input: EphKeyQ, EPuKState, ShSQ, ShSState, G, netPuK
If (len(ShSQ) <= 1) or (len(EphKeyQ) <= 1):
    statusHandler(EphKeyQ, EPuKState, ShSQ, ShSState, G, netPuK)
(ePrK, ePuK) = EphKeyQ.pop(o)
ShS = ShSQ.pop(o)
return (ePrK, ePuK, ShS)
```

Thus, it is checked with the if cycle if the queue lengths len(ShSQ) or len(EphKeyQ) are less or equal than one because if there is only one item in the queue the corresponding keys are likely in calculation.

Also, performing the checking for the shared secret queue ShSQ only could be enough since calculation of the ephemeral queue EphKeyQ items has priority. If the check condition is verified a new calculation is continued or started calling the statusHandler function.

If the condition of the if cycle is not satisfied, both ephemeral keys and ShS are available, i.e., either were available before, or have just been calculated by the statusHandler call.

Thus, the first pair queue element is removed from the queue and assigned to the ephemeral pair, using pop(0) on the queue (.pop method, e.g. in Python) and the same for the shared secret. The triplet (ePrK, ePuK, ShS) with the so assigned values is returned as result of the GET IDENTITY operation, i.e., of getIdentityHandler function.

Summarizing, the GET IDENTITY handler implementation, if there is at least an ephemeral key pair available and complete in the queue of the ephemeral pairs and there is at least a shared secret available and complete in the queue of the shared secrets, to the ephemeral pair is assigned the value of the first pair queue element, and to the shared secret is assigned the value of the first element of the queue of shared secrets, the step of performing an interruptible calculation 100 of the first and second scalar multiplication is completed and to the ephemeral pair is assigned the value of the only pair queue element in the ephemeral Queue EphKeyQ, and to the shared secret ShS is assigned the value of the only element of the Queue (ShSQ) of shared secrets, i.e. the pair and shared secret whose calculation have just been completed.

In eUICC, actually, the server Elliptical Curve public keys srvPuk are different per profile and actually also in the same profile is theoretically possible to have multiple server Elliptical Curve public keys srvPuk (for simplicity in the description it is assumed one key srvPuk per profile).

In this case, the private key ephPrK is "good" for all profiles, but once it is used for one it is better notto use it for other profiles for security.

Therefore, during pre-computation of shared secret ShS values, it is better to compute them in different slots.

In Table 1 are shown pre-computed elements at a given time, the card configuration time. Table 1 may be embodied by a tabular database structure having records as rows and fields in columns, which is stored in the memory of the card.

TABLE 1

| Key slot | EphKeyQ.epPrK | EphKeyQ.ephPuk | ShSQ profile P1 | ShSQ Profile n, Pn | Used ? |
|---|---|---|---|---|---|
| #1 | XXXX | XXXX | | | N |
| #2 | XXXX | XXXX | | | N |
| #3 | XXXX | XXXX | | | N |
| #4 | XXXX | XXXX | | | N |
| #5 | XXXX | XXXX | | | N |

In the first column is the key slot indicating the record in the memory 12a, in the second the private key EphKeyQ[i].epPrK queue completion status (the X indicates the completion of the calculation, four X means complete), in the third the public key EphKeyQ[i].ephPuk queue completion status, in the fourth the shared secret ShS for profile 1, P1, completion status, in the fifth shared secret queue ShSQ for profile n (es. n=2, Pn=P2) completion status, while the sixth column indicates if the data in the corresponding key slot is used or not (Y/N), i.e., used in the concealing of a subscriber identifier PI for a given profile. es. P1.

Five slots corresponding to five rows are shown in Table 1.

In Table 2 are shown pre-computed elements at a next given time, when a first profile is downloaded and a first STATUS APDU is received.

Thus, private and public key are present for all the slots, which are not used at this time instant.

TABLE 2

| Key slot | EphKeyQ.epPrK | EphKeyQ.ephPuk | ShSQ Profile 1, P1 | ShSQ Profile n, Pn | Used ? |
|---|---|---|---|---|---|
| #1 | XXXX | XXXX | XX | | N |
| #2 | XXXX | XXXX | | | N |

TABLE 2-continued

| Key slot | EphKeyQ.epPrK | EphKeyQ.ephPuk | ShSQ Profile 1, P1 | ShSQ Profile n, Pn | Used ? |
|---|---|---|---|---|---|
| #3 | XXXX | XXXX | | | N |
| #4 | XXXX | XXXX | | | N |
| #5 | XXXX | XXXX | | | N |

The shared secret ShS Profile 1, P1 calculation is initiated in key slot #1.

In Table 3 are shown pre-computed elements at a next given time, when a second profile is downloaded and another STATUS APDU is received.

Slots #2 and #3 are also filled for the shared secret ShS of profile 1.

TABLE 3

| Key slot | EphKeyQ.epPrK | EphKeyQ.ephPuk | ShSQ profile 1, P1 | ShSQ Profile n, Pn | Used ? |
|---|---|---|---|---|---|
| #1 | XXXX | XXXX | XXXX | | N |
| #2 | XXXX | XXXX | XXXX | | N |
| #3 | XXXX | XXXX | XXXX | | N |
| #4 | XXXX | XXXX | | | N |
| #5 | XXXX | XXXX | | | N |

In Table 4 hereinbelow are shown pre-computed elements at a next given time, when a first profile, i.e. profile 1, is enabled and a GET IDENTITY operation is received at the user equipment 12.

TABLE 4

| Key slot | EphKeyQ.epPrK | EphKeyQ.ephPuk | ShSQ profile 1, P1 | ShSQ Profile n, Pn | Used ? |
|---|---|---|---|---|---|
| #1 | XXXX | XXXX | XXXX | | Y |
| #2 | XXXX | XXXX | XXXX | | N |
| #3 | XXXX | XXXX | XXXX | | N |
| #4 | XXXX | XXXX | | | N |
| #5 | XXXX | XXXX | | | N |

The values in the key slot #1 are used. At GET IDENTITY, it is needed a triplet (ephPrK, ephPuK=ephPrK*G, ShS=ephPrK*srvPuK), which was never used (for security purpose).

The procedure needs to choose:
- if present, a set ephPrK, ephPuK, ShS associated to the current profile it is used and flagged as used;
- otherwise, if a token is "almost finished", i.e. the keys ephPrK, ephPuK, ShS are near completion, and completion it is estimated to be fast, the computation is completed and used directly.

Additionally, if no token is nearly finished, i.e. reaches a five degree of completion, a linear combination of ephPrK, ephPuK, ShS of multiple lines may be performed according to the corresponding method described in the patent application EP 2020425046.8.

In Table 5 are shown pre-computed elements at a next given time, when a second profile Pn=P2 is enabled and another STATUS APDU is received.

TABLE 5

| Key slot | EphKeyQ.epPrK | EphKeyQ.ephPuk | ShSQ profile P1 | ShSQ Profile Pn | Used ? |
|---|---|---|---|---|---|
| #1 | XXXX | XXXX | XXXX |  | Y |
| #2 | XXXX | XXXX | XXXX |  | N |
| #3 | XXXX | XXXX | XXXX |  | N |
| #4 | XXXX | XXXX |  | XXXX | N |
| #5 | XXXX | XXXX |  | XXXX | N |

Slot 4 and 5 are filled for the shared secret ShS of profile 2 (n=2).

In Table 6 are shown pre-computed elements at a next given time, when a second profile, i.e. profile 2 or P2, is enabled and again another STATUS APDU is received.

TABLE 6

| Key slotX | EphKeyQ[i]. epPrK | EphKeyQ[i]. ephPuk | ShSQ profile 1, P1 | ShSQ Profile n, Pn | Used ? |
|---|---|---|---|---|---|
| #6 | XXXX | X |  |  |  |
| #2 | XXXX | XXXX | XXXX |  | N |
| #3 | XXXX | XXXX | XXXX |  | N |
| #4 | XXXX | XXXX |  | XXXX | N |
| #5 | XXXX | XXXX |  | XXXX | N |

Summing up, different storing slots are defined in the card memory, in which the completed ephemeral keys and shared secret are stored, forming a triplet or set of keys when all the calculations are completed. In embodiments, the procedure may be stopped when all the key triplets are completed.

As shown, a number of slots can be already occupied with ephemeral keys values loaded at a card creation time, while the corresponding Shared Secret cannot be loaded at card creation time as it depends on the server public key.

Therefore, it is provided to store the keys in a first sequence of slots, then when a GET IDENTITY is received for a first profile, a triplet of keys in one of the slots of this first sequence is taken and the slot is flagged as used, so that it cannot be used again.

Keys for a next profile, e.g. profile 2, are stored in a next sequence of slots, so that when a GET identity for the next profile is received, the triplet will be picked in this next sequence.

The described solution thus has several advantages with respect to the prior art solutions.

The method and system here described allows to perform a quicker and simpler identity concealing operation for SUPI with IoT devices, avoiding the need for them to have a cryptographic co-processor, i.e. a dedicated ALU present in high end smartcards to accelerate asymmetric computations, to make the process faster.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method for concealing a subscription identifier at a user equipment of a mobile communication network, comprising a mobile equipment and an integrated circuit card which stores subscription data for accessing the mobile communication network including the subscription identifier, the method comprising:

receiving at the user equipment a corresponding request by a server to provide a corresponding subscription identifier;
sending, by the mobile equipment, an identity retrieve command to the integrated circuit card;
performing an elliptical curve encryption of the subscription identifier to generate a concealed subscription identifier, the elliptical curve encryption comprising performing, at the integrated circuit card:
 generating an ephemeral key pair comprising an ephemeral private key and an ephemeral public key, including performing a first scalar multiplication of the ephemeral private key by a generator value to obtain the ephemeral public key;
 generating a shared secret key performing a second scalar multiplication of the ephemeral private key by a server public key, the first and second scalar multiplications being performed iteratively for each bit of the ephemeral private key; and
 using the shared secret key to derive keys used to encrypt the subscription identifier, which is to be sent to the server as the concealed subscription identifier in response to the identity retrieve command;
performing, before receiving the identity retrieve command at the integrated circuit card, a pre-calculation of the ephemeral key pair comprising the ephemeral private key and the ephemeral public key and the shared secret key, the pre-calculation including:
 performing an interruptible calculation of the first and second scalar multiplication during each execution time of given periodic commands sent by the mobile equipment to the integrated circuit card; and
 storing a respective state of completion of the interruptible calculation, the interruptible calculation including checking, at a beginning of each execution time, the respective state of completion; and
 in response to the respective state of completion indicating completion of a computation of a valid ephemeral key pair or shared secret key, storing corresponding values of the ephemeral private key, the ephemeral public key, and the shared secret key in a table in a memory of the integrated circuit card at the user equipment.

2. The method of claim 1, further comprising interrupting the calculation at an end of the execution time based on an estimated execution duration, or interrupting the calculation under control of a card scheduler.

3. The method of claim 1, wherein the performing the interruptible calculation of the first and second scalar multiplication comprises:

performing a third verifying step verifying whether there are less available ephemeral key pairs than available shared secret keys; and
in response to a result of the third verifying step being affirmative, starting a new calculation of the ephemeral key pair, then starting a new calculation of the shared secret key.

4. The method of claim 3, wherein the performing the interruptible calculation of the first and second scalar multiplication further comprises:

performing a second verifying step verifying whether a calculation of the shared secret key is in progress by checking a completion status of the shared secret key computation; and
in response to a result of the second verifying step being affirmative, continuing the calculation of the shared secret key before performing the third verifying step.

5. The method of claim 4, wherein the performing the interruptible calculation of the first and second scalar multiplication further comprises:
  performing a first verifying step verifying whether a calculation of the ephemeral public key is in progress by checking a completion status of the ephemeral public key computation; and
  in response to a result of the first verifying step being affirmative, continuing the calculation of the ephemeral public key before performing the second verifying step.

6. The method according to claim 1, further comprising:
  utilizing an ephemeral queue in which are added computed ephemeral key pair values; and
  utilizing a shared secret queue in which are added shared secret key values computed at each iteration.

7. The method according to claim 6, further comprising, in response to the identity retrieve command being received at the integrated circuit card, and in response to at least one ephemeral key pair being available and complete in the ephemeral queue and there being at least one shared secret key available and complete in the shared secret queue:
  assigning to the at least one ephemeral key pair a value of a first pair queue element in the ephemeral queue; and
  assigning to the at least one shared secret key a value of a first element of the shared secret queue.

8. The method according to claim 6, further comprising, in response to the identity retrieve command being received at the integrated circuit card, and in response to no ephemeral key pair being available and complete in the ephemeral queue or no shared secret key being available and complete in the shared secret queue:
  completing the step of performing the interruptible calculation of the first and second scalar multiplication;
  assigning to the ephemeral key pair a value of an only pair queue element in the ephemeral queue; and
  assigning to the shared secret key a value of an only element of the shared secret queue.

9. The method according to claim 1, further comprising:
  storing a set of values of the completed ephemeral private key, ephemeral public key, and shared secret key in corresponding slots of the integrated circuit card memory; and
  in response to multiple user profiles being downloaded in different instants to the integrated circuit card and the set of values for each profile being stored in a respective set of slots, given a current profile among the multiple user profiles that is enabled for operation, using the set of values associated to the current profile and flagging the set of values as used in response to the set of values being present with completed values.

10. The method according to claim 1, wherein the iterative scalar multiplications are a Montgomery ladder scalar multiplication.

11. The method according to claim 1, wherein the given periodic commands are application protocol data unit status commands.

12. A user equipment configured to conceal a subscription identifier, the user equipment comprising:
  a mobile equipment; and
  an integrated circuit card configured to store subscription data for accessing a mobile communication network, the subscription data including the subscription identifier;
  wherein the user equipment configured to:
    receive a corresponding request by a server to provide a corresponding subscription identifier;
    send, by the mobile equipment, an identity retrieve command to the integrated circuit card;
    perform an elliptical curve encryption of the subscription identifier to generate a concealed subscription identifier, the elliptical curve encryption comprising the integrated circuit card configured to:
      generate an ephemeral key pair comprising an ephemeral private key and an ephemeral public key, including performing a first scalar multiplication of the ephemeral private key by a generator value to obtain the ephemeral public key;
      generate a shared secret key performing a second scalar multiplication of the ephemeral private key by a server public key, the first and second scalar multiplications being performed iteratively for each bit of the ephemeral private key; and
      use the shared secret key to derive keys used to encrypt the subscription identifier, which is to be sent to the server as the concealed subscription identifier in response to the identity retrieve command;
    perform, before receiving the identity retrieve command at the integrated circuit card, a pre-calculation of the ephemeral key pair comprising the ephemeral private key and the ephemeral public key and the shared secret key, the pre-calculation including:
      perform an interruptible calculation of the first and second scalar multiplication during each execution time of given periodic commands sent by the mobile equipment to the integrated circuit card; and
      store a respective state of completion of the interruptible calculation, the interruptible calculation including checking, at a beginning of each execution time, the respective state of completion; and
    in response to the respective state of completion indicating completion of a computation of a valid ephemeral key pair or shared secret key, store corresponding values of the ephemeral private key, the ephemeral public key, and the shared secret key in a table in a memory of the integrated circuit card at the user equipment.

13. The user equipment of claim 12, wherein the user equipment is further configured to interrupt the calculation at an end of the execution time based on an estimated execution duration, or interrupt the calculation under control of a card scheduler.

14. The user equipment of claim 12, wherein the user equipment configured to perform the interruptible calculation of the first and second scalar multiplication comprises the user equipment configured to:
  perform a first verifying step verifying whether a calculation of the ephemeral public key is in progress by checking a completion status of the ephemeral public key computation;
  if a result of the first verifying step is affirmative, continue the calculation of the ephemeral public key, then perform a second verifying step verifying whether a calculation of the shared secret key is in progress by checking a completion status of the shared secret key computation, or if the result of the first verifying step is negative, then perform directly the second verifying step,
  if a result of the second verifying step is affirmative, continue the calculation of the shared secret key, then perform a third verifying step verifying if there are less available ephemeral key pairs than available shared secret keys, or if the result of the second verifying step is negative, then perform directly the third verifying step; and if a result of the third verifying step is affirmative, start a new calculation of the ephemeral key pair, then start a new calculation of the shared secret key, or if the result of the third verifying step is negative, then execute directly the shared secret key calculation.

15. The user equipment according to claim 12, further configured to:

utilize an ephemeral queue in which are added computed ephemeral key pair values; and utilize a shared secret queue in which are added shared secret key values computed at each iteration.

16. The user equipment according to claim 12, further configured to:

store a set of values of the completed ephemeral private key, ephemeral public key, and shared secret key in corresponding slots of the integrated circuit card memory; and in response to multiple user profiles being downloaded in different instants to the integrated circuit card and the set of values for each profile being stored in a respective set of slots, given a current profile among the multiple user profiles that is enabled for operation, use the set of values associated to the current profile and flag the set of values as used in response to the set of values being present with completed values.

17. A non-transitory computer-readable media storing computer instructions for concealing a subscription identifier, that, when executed by one or more processors of a user equipment, cause the one or more processors to perform the steps of:

receive a corresponding request by a server to provide a corresponding subscription identifier;

send an identity retrieve command to an integrated circuit card of the user equipment;

perform an elliptical curve encryption of the subscription identifier to generate a concealed subscription identifier, the elliptical curve encryption comprising the integrated circuit card configured to:

generate an ephemeral key pair comprising an ephemeral private key and an ephemeral public key, including performing a first scalar multiplication of the ephemeral private key by a generator value to obtain the ephemeral public key;

generate a shared secret key performing a second scalar multiplication of the ephemeral private key by a server public key, the first and second scalar multiplications being performed iteratively for each bit of the ephemeral private key; and use the shared secret key to derive keys used to encrypt the subscription identifier, which is to be sent to the server as the concealed subscription identifier in response to the identity retrieve command;

perform, before receiving the identity retrieve command at the integrated circuit card, a pre-calculation of the ephemeral key pair comprising the ephemeral private key and the ephemeral public key and the shared secret key, the pre-calculation including:

perform an interruptible calculation of the first and second scalar multiplication during each execution time of given periodic commands sent to the integrated circuit card; and store a respective state of completion of the interruptible calculation, the interruptible calculation including checking, at a beginning of each execution time, the respective state of completion; and in response to the respective state of completion indicating completion of a computation of a valid ephemeral key pair or shared secret key, store corresponding values of the ephemeral private key, the ephemeral public key, and the shared secret key in a table in a memory of the integrated circuit card in the user equipment.

18. The non-transitory computer-readable media of claim 17, further comprising computer instructions to interrupt the calculation at an end of the execution time based on an estimated execution duration, or interrupt the calculation under control of a card scheduler.

19. The non-transitory computer-readable media of claim 17, wherein the computer instructions to perform the interruptible calculation of the first and second scalar multiplication comprise computer instructions to:

perform a first verifying step verifying whether a calculation of the ephemeral public key is in progress by checking a completion status of the ephemeral public key computation;

if a result of the first verifying step is affirmative, continue the calculation of the ephemeral public key, then perform a second verifying step verifying whether a calculation of the shared secret key is in progress by checking a completion status of the shared secret key computation, or if the result of the first verifying step is negative, then perform directly the second verifying step, if a result of the second verifying step is affirmative, continue the calculation of the shared secret key, then perform a third verifying step verifying if there are less available ephemeral key pairs than available shared secret keys, or if the result of the second verifying step is negative, then perform directly the third verifying step; and if a result of the third verifying step is affirmative, start a new calculation of the ephemeral key pair, then start a new calculation of the shared secret key, or if the result of the third verifying step is negative, then execute directly the shared secret key calculation.

20. The non-transitory computer-readable media according to claim 17, further comprising computer instructions to:

utilize an ephemeral queue in which are added computed ephemeral key pair values; and utilize a shared secret queue in which are added shared secret key values computed at each iteration.

* * * * *